United States Patent

[11] 3,609,110

| [72] | Inventor | Ju Kumanotani |
| | | Chofu-shi, Tokyo-to, Japan |
| [21] | Appl. No. | 680,973 |
| [22] | Filed | Nov. 6, 1967 |
| [45] | Patented | Sept. 28, 1971 |
| [73] | Assignee | Kansai Paint Company Limited |
| | | Kanzaki, Amagasaki-shi, Hyogo-ken, Japan |
| [32] | Priority | Nov. 7, 1966 |
| [33] | | Japan |
| [31] | | 41/73164 |

[54] COMPOSITION FOR ELECTROPHORETIC DEPOSITION
12 Claims, No Drawings

[52] U.S. Cl. ..................... 260/29.7, 204/181, 260/94.7
[51] Int. Cl. ........................ C09d 3/00
[50] Field of Search ............... 260/29.7 H, 29.7 AT, 29.7 W; 204/181

[56] References Cited
UNITED STATES PATENTS

| 2,933,468 | 4/1960 | Aldrigde | 260/29.7 AT |
| 3,002,940 | 10/1961 | Holloway | 260/29.7 H |
| 3,055,855 | 9/1962 | Anderson | 260/29.7 H |
| 3,314,911 | 4/1967 | Cull | 260/29.7 AT |
| 3,321,430 | 5/1967 | Ott | 260/29.7 H |
| 3,365,411 | 1/1968 | Mertzweiller | 260/29.7 W |
| 3,366,563 | 1/1968 | Hart | 260/29.7 H |
| 3,428,586 | 2/1969 | Coats | 260/29.7 H |
| 3,428,589 | 2/1969 | Coats | 260/29.7 H |
| 3,431,227 | 3/1969 | Kastning | 260/29.7 H |
| 2,634,256 | 4/1953 | Sparks et al. | 260/78.4 |
| 3,230,162 | 1/1966 | Gilchrist | 260/18 D |
| 3,488,332 | 1/1970 | Hiraoka et al. | 260/83.7 |

FOREIGN PATENTS

| 800,161 | 8/1958 | Great Britain | 260/29.7 AT |
| 40-7051 | 4/1965 | Japan | 260/29.7 |

*Primary Examiner*—Jay H. Woo
*Attorney*—Stephens, Huettig and O'Connell

ABSTRACT: In a coating composition adapted for electrophoretic deposition containing an aqueous medium and a resinous binder dispersed therein, the improvement comprising the resinous binder being a modified polybutadiene glycol prepared by reacting a polybutadiene glycol having hydroxyl group at both ends of the polymer main chain and a number average molecular weight of 200 to 10,000 with acid anhydride to produce a half ester of the polybutadiene glycol and neutralizing the resultant half ester with a base to turn it water dispersible.

COMPOSITION FOR ELECTROPHORETIC DEPOSITION

This invention relates to new and useful electrophoretic coating compositions, and more particularly to water-thinnable concentrated compositions and bath compositions adapted for electrophoretic deposition, the binder of which is a specific modified butadiene polymer.

The electrophoretic deposition of resinous coatings from aqueous medium is well known in the art, and for such purposed many aqueous paints containing various resin binders have been proposed. However, the known paints were not satisfactory for numerous properties required in combination for such purposes, including, for example, good stability, high throwing power to give even coatings onto whole surface of the object to be coated, low selectivity of electrodeposition to give uniform coatings even in repeated use, and capacity to give coated film having excellent properties.

An object of the invention is to provide a new and useful electrophoretic coating composition which provides the properties required for electrodeposition.

Another object of the invention is to provide an electrophoretic coating composition which is stable and thinnable with water to desired extent to give stable bath composition.

Further object of the invention is to provide a coating composition adapted for electrophoretic deposition, which displays high throwing power to give uniform coatings onto whole surface of the objects to be coated.

Still further object of the invention is to provide a coating composition which displays low selectivity of electrodeposition to give uniform coatings even in repeated use.

Still another object of the invention is to provide a coating composition from which the coated film having excellent resistant properties, such as good resistance to water, chemicals, corrosion as well as excellent mechanical strengths is obtainable by electrophoretic deposition.

These and other objects of the invention will be apparent from the following description.

The above objects of the invention can be accomplished with a concentrated coating composition adapted for electrophoretic deposition, which comprises an aqueous dispersion of modified butadiene polymer binder prepared by reacting a polybutadiene glycol having hydroxyl group at both ends of the polymer main chain with an acid anhydride to produce half ester of the polybutadiene glycol and neutralizing the resultant half ester with a base to turn it water-dispersible.

This invention is based on the discovery that electrophoretic coating composition containing as a binder the specific modified butadiene polymers as above fully satisfy almost all properties required for electrophoretic deposition.

The term "water-depersible" is intended to include materials which dissolve or which can be emulsified in water, and the term "aqueous dispersion" is intended to include aqueous solution or aqueous emulsion.

The polybutadiene glycols used in the invention have hydroxyl group at both ends of the polymer main chain and include butadiene homopolymer glycols and butadiene copolymer glycols. The butadiene homopolymer glycols are 1,2-addition butadiene homopolymer glycol, 1,4-addition butadiene homopolymer glycol and 1,2- and 1,4-random addition butadiene homopolymer glycol.

The butadiene copolymer glycols are those comprising at least 70 weight percent of butadiene and at most 30 weight percent of other monomer and having hydroxyl group at both ends of the polymer main chain. Such monomers other than butadiene are, for example, isoprene, chloroprene, styrene, methyl methacrylate, acrylonitrile etc. Of these polybutadiene glycols 1,2-addition butadiene homopolymer glycol is most desirable, giving a especially excellent coasted film by electrodeposition. The molecular weight of the polybutadiene glycols varies over a wide range, but it is desirable to use those having number average molecular eight ranging from 200 to 10,000, molecular eight the better result is obtainable in electrodeposition, giving uniform coatings even in repeated use.

The polybutadiene glycols can be prepared by conventional methods, such as ion polymerization. The most desirable polymerization method is living polymerization as the polymer obtained by such method has a narrow range of distribution of molecular weight.

The living polymerization method of butadiene has been known in the art and disclosed in Japanese Patent Publications No. 7051/1965 and 17,485/1967.

For instance, 1,2-addition butadiene homopolymer glycol having hydroxyl group at both ends of the polymer main chain may be produced by adding butadiene or a mixture of butadiene and a diluent to a mixture of Lewis base, such as tetrahydrofuran, and alkali metal, such as lithium or sodium, polymerizing the butadiene to the desired molecular weight, and adding an alkylene oxide, such as ethylene oxide, propylene oxide, etc., to terminate the polymerization reaction. Naphthalene, 1,2-diphenylbenzene and the like aromatic hydrocarbon activators may be added to the polymerization system, if desired. When a mixture of butadiene and one of more of other monomer is used as a starting monomer and terminated with the above agent, butadiene copolymer glycols having hydroxyl group at both ends of the polymer main chain is obtainable.

In the invention the polybutadiene glycols are reacted with acid anhydrides to produce half esters of the polybutadiene glycols. Any aliphatic or aromatic acid anhydrides may be used. The typical examples are maleic anhydride, phthalic anhydride, 3-chlorophthalic anhydride, 4-chlorophthalic anhydride, tetrahydrophthalic anhydride, hexahydrophthalic anhydride, endocis-bicyclo (2,2,1)-5-heptene-2,3-dicarboxylic acid anhydride, trimellitic acid anhydride, succinic anhydride, dodecenyl succinic acid anhydride, etc. The proportion of the anhydride to the polybutadiene glycol is not of primary significance. Preferably, the anhydride is used in stoichiometric amount or thereabout to produce half ester of the polybutadiene glycols. Usually, 0.5 to 1.0 equivalent amount of the anhydride is used calculated on the hydroxyl group contained in the polybutadiene glycols.

Said reaction may be carried out in molten state. The preferred reaction temperature is usually in the range of 60 to 180° C., most desirable being 100 to 140° C. The reaction usually completes in 0.5 to 2 hrs. To prevent undesired side reaction it is desirable to carry out the reaction in inert gas atmosphere e.g., nitrogen gas and the like.

To prevent undesired gellation there may be added teriarybutylhydroxy toluene and the like antioxidants, mercaptans and the like chain transfer agent or bezoquinone and the like polymerization inhibitors.

Thus the half esters of polybutadiene seen are obtained in the form of molten state.

The resultant half ester is then neutralized with a base to produce the desired water-dispersible salt thereof. Said reaction may be desirably carried out in the presence of hydrophilic organic solvents, for example, alkoxy alkanols, such as methoxy ethanol, ethoxy ethanol, butoxy ethanol, etc.; glycol ethers, such as diethyleneglycol methylether, diethyleneglycol ethylether, 1-butoxyethoxy-2-propanol, etc.; alcohols such as butyl alcohol, tetrahydrofurfrylalcohol, tetrahydropyran-2-methanol, etc.; glycols such as ethylene glycol, diethylene glycol, propylene glycol, hexylene glycol, etc.; and ethers such as tetrahydrofuran, dioxane, etc. The solvents are preferably used in figures, 5 to 100 weight parts, based on 100 weight parts of polybutadiene glycols. The neutralizing action is usually carried out at a room temperature or thereabout. As the base there may be used sodium hydroxide, potassium hydroxide, ammonium hydroxide, ammonium carbonate, sodium carbonate, potassium carbonate, and the like inorganic bases, and ethanolamine, diethanolamine, triethanolamine, dimethylaminoethanol, diethylaminoethanol, trimethylamine, triethylamine, N-ethylmorpholine, 2-amino-2-methyl-1-propanol, 2-amino-2-methyl-1,3-propanediol, tris(hydroxymethyl) aminomethane and the like aliphatic amines. Said base may be used in the form of aqueous solution to produce aqueous resin dispersion. Said base is used at least necessary amount to disperse the half ester into water. Preferably 0.5 to 1.2 equivalent amount of base is used calculated on the carboxyl group of the ester.

The aqueous dispersion thus obtained contains the modified butadiene polymers, i.e., salts of half esters of polybutadiene glycols, in a concentration of 30 to 60 weight percent, and has a pH value of 7.0 to 8.5. The aqueous dispersion is stable and may be used for electrodeposition as it is or after pigmented by pigments. The pigments used are, for example, talc, calcium carbonate, iron oxide, titanium dioxide, lead chromate, strontium chromate, carbon black, etc. The pigments to binder ratio by weight is desirably in the range of from 1:1 to 1:5. There may be further added pigment dispersing agent, drying agent and the like, where necessary. The aqueous dispersion or paint may be diluted with water to any desired extent to obtain a bath composition for electrodeposition. The solid content in the bath composition is usually in the range of 5 to 30 weight percent, preferably 10 to 20 weight percent.

The composition of the invention are used in conventional manner by passing an electric current through the dispersion to deposit the film upon an immersed object, which is anode of the electrical system.

For fuller understanding of the invention examples are given below, in which all parts and percentage represent weight parts unless otherwise specified.

EXAMPLE 1

In a reactor equipped with a thermometer, agitator, and gas injector were placed 100 parts of 1,2-addition butadiene homopolymer glycol (number average molecular weight of 1,000) having hydroxyl group at both ends of the polymer main chain, prepared by living polymerization, and 19.6 parts maleic anhydride, and heated up to 100° C. with stirring nitrogen gas being introduced. The stirring was continued at 100° C. for 60 minutes and then the reaction mixture was cooled to room temperature. To 100 parts of the cooled mixture was added 20 parts of butoxyethanol and stirred thoroughly, to which was added slowly with stirring 50 parts of 22 percent aqueous solution of diethanolamine and further add 80 parts of water. The stirring was continued till homogeneous aqueous composition was produced, which contained 40 percent water-soluble resin.

This composition was very stable and no precipitation was observed after 60 days storage at room temperature.

From the aqueous composition prepared by quite same manner as in example 1 (hereinafter referred to as "aqueous composition of example 1") a bath composition for electrophoretic deposition was prepared by the following manner:

| | |
|---|---|
| Aqueous composition of example 1 | 515 parts |
| Titanium dioxide 280 parts | |
| Carbon black 10 parts | |
| Water | 30 parts |

The above components were mixed in a pebble-mill for 20 hours to thoroughly disperse pigment. To the mixture were added 1,620 parts of aqueous composition of example 1 and 80 parts of water and mixed for another 2 hours, which was further diluted with water to produce a bath composition for electrophoretic deposition, in grey color, of 10 percent solid content. The electrodeposited coating obtained therefrom was curable an elevated temperature to produce water-insoluble film of excellent properties.

EXAMPLE 2

In the reactor same as that of example 1 were placed 100 parts of 1,2-addition butadiene homopolymer glycol (number average molecular weight of 2,000) having hydroxyl group at both ends of he polymer main chain, prepared by living polmerization, 14.8 parts of phthalic anhydride and 0.05 part of tertiarybutylhydroxy toluene, and heated up to 140° C., nitrogen gas being introduced. The stirring was continued at 140 ° C. for 40 minutes and then the reaction mixture was cooled to room temperature. To 100 parts of the cooled mixture was added 40 parts of butoxyethanol and stirred thoroughly, to which was added slowly with stirring 6.1 parts of 28 percent ammonium water and further added 103.9 parts of water. The stirring was continued till homogeneous aqueous composition was produced, which contained 40 percent of water-soluble resin.

From the above aqueous composition a bath composition, the deposited coating of which was curable at an elevated temperature, was prepared by the same manner as in example 1.

EXAMPLE 3

In the reactor same as that of example 1 were placed 100 parts of 1,2-addition butadiene homopolymer glycol (number average molecular weight of 5,000) having hydroxyl group at both ends of the polymer main chain, prepared by living polymerization, 7.7 parts of trimellitic acid anhydride and 0.1 part of tertiarybutylhydroxy toluene, and heated up to 175° C. with stirring, nitrogen gas being introduced. The stirring was continued at 175 to 180° C. for 30 minutes and then the resultant reaction mixture was cooled to room temperature. To 100 parts of the cooled mixture was added 80 parts of butoxyethanol and stirred thoroughly, to which was added slowly with stirring 20 parts of 22 percent aqueous solution of diethanolamine and further added 50 parts of water. The stirring was continued till homogeneous aqueous composition was produced, which contained 40 percent of water-soluble resin.

From the above aqueous composition a bath composition, the deposited coating of which was curable at an elevated temperature, was prepared by the same way as in example 1.

EXAMPLE 4

In the reactor same as that of example 1 were placed 100 parts of butadiene-styrene copolymer glycol (weight ratio of butadiene : styrene of 70:30, number average molecular weight of 2,000) having hydroxyl group at both ends of the polymer main chain, prepared by living polymerization, 16.3 parts of phthalic anhydride and 0.05 part of tertiarybutylhydroxy toluene, and heated up to 140° C., nitrogen gas being introduced. The stirring was continued at 140° C. for 40 minutes and then the reaction mixture was cooled to room temperature. To 100 parts of the cooled mixture was added 50 parts of butoxyethanol and stirred thoroughly, to which was added a mixture of 9.6 parts of triethylamine and 10.4 parts of water with stirring and further added 80 parts of water. The stirring was continued till homogeneous aqueous composition was produced, which contained 40 percent of water-soluble resin.

From the above aqueous composition a bath composition, the deposited coating of which was curable at an elevated temperature, was prepared by the same manner as in example 1.

Using the above bath compositions prepared by example 1 to 4, electrodeposition was conducted under the following conditions, and electrodeposition characteristics of the composition and properties of the film deposited therefrom were tabulated below.

The electrophoretic deposition was carried out by using anode of steel plate, 5=10 cm., treated with zinc phosphate. The anode and cathode plates were disposed opposite at an interval of 10 cm. and dipped in a bath composition containing 10 percent solid and direct current at constant voltage was charged to the bath at 25° C. for 2 minutes, for electrodeposition. After breaking the current the anode plate with coating electrodeposited was taken out and after rinsing with water baked at 140° C. for 30 minutes.

1. Throwing Power

Throwing power means the capacity of the paint to coat the areas of the anode which are difficult of access.

Two steel plates were used as anode at an interval of 2 mm., and the amounts of paint deposited and the areas of coated surfaces on the inner and outer surfaces of the anode plates were sought according to the method disclosed in "Deutsche Farben Zeitshrift" Sept., 1965, p. 361–370 and the rate of amount deposited on the inner surface and rate of area of the coating on the inner surface were determined by the following equations:

Rate of amount deposited on inner surface of anode (percent)

$$= \frac{\text{Amount deposited on inner surface of anode}}{\text{Total amount deposited on inner and outer surfaces of anode}} \times 100$$

Rate of area of coating on inner surface of anode (percent)

$$= \frac{\text{Area of coated film on inner surface of anode}}{\text{Area of coated film on outer surface of anode}} \times 100$$

TABLE 1

|  | Ex. 1 | Ex. 2 | Ex. 3 | Ex. 4 |
|---|---|---|---|---|
| Rate of amount deposited on inner surface of Anode (%) | 25 | 28 | 22 | 26 |
| Rate of area of coating on inner surface of Anode (%) | 82 | 86 | 81 | 84 |

2. Relation between thickness of the film and voltage

The thickness of films deposited on the anode plate by varying voltage was measured and the relation between the thickness and voltage was shown in table 2 below.

TABLE 2

| Voltage | Thickness of Film ($\mu$) | | | |
|---|---|---|---|---|
|  | Ex. 1 | Ex. 2 | Ex. 3 | Ex. 4 |
| 40 | 12 | 11 | 14 | 12 |
| 60 | 23 | 17 | 24 | 24 |
| 80 | 29 | 23 | 36 | 31 |
| 100 | 37 | 28 | 42 | 40 |
| 120 |  | 33 |  |  |

3. Stability of Bath composition in long period Electrodeposition Test

By supplying paint daily to the bath so as to exchange the whole amount of paint in a week (turn over per week), the properties of electrodeposition and the appearance of coated film were sought at the initial stage and after 4 months and the results were shown in table 3.

4. Performance of Electrodeposited Film

The results of measurement of the films electrodeposited by using the bath compositions of examples 1 to 4 were shown in table 4 below.

TABLE 4

|  | Example | | | |
|---|---|---|---|---|
|  | 1 | 2 | 3 | 4 |
| Film thickness ($\mu$) | 26 | 26 | 25 | 27. |
| Pencil hardness | H | H | 2H | H. |
| Impact resistance (Du Pont method 500 g., ½"): | | | | |
| Front | 50 cm. OK | 50 cm. OK | 50 cm. OK | 50 cm. OK. |
| Back | 50 cm. OK | 50 cm. OK | 50 cm. OK | 50 cm. OK. |
| Erichsen test | 8 mm. OK | 8 mm. OK | 8 mm. OK | 8 mm. OK. |
| Adhesion test (cross hatch) | Excell. | Excell. | Excell. | Excell. |
| Salt spray resistance (after 168 hrs. exposure). | Under 3 mm | Under 3 mm | Under 2 mm | Under 3 mm. |
| Immersion test (in 5% NaOH aqueous solution at 25° C. for 3 days). | No change | No change | No change | No change. |

As evident from the above electrodeposition characteristics and the performances of electrodeposited films measured as above:
1. Throwing power is excellent,
2. When successively electrodeposited for 4 months at a turn over per week, the electrodeposition characteristics at the initial stage and after 4 months substantially show almost no variation, and this also shows that the bath composition is stable for a long period and selectivity of electrodeposition is extremely low and negligible, and
3. the performances of the electrodeposited films also are exceptionally excellent.

What we claim is:

1. In a coating composition adapted for electrophoretic deposition containing an aqueous medium and a resinous binder dispersed therein, the improvement wherein the resinous binder comprises a modified polymer glycol prepared by reacting a butadiene polymer glycol having a hydroxyl group at both ends of the polymer main chain and a number average molecular weight of 200 to 10,000 with a carboxylic acid anhydride selected from the group consisting of maleic anhydride, phthalic anhydride, 3-chlorophthalic anhydride, 4-chlorophthalic anhydride, tetrahydrophthalic anhydride, hexahydrophthalic anhydride, endo-cis-bicyclo (2,2,1)-5-heptene-2,3-dicarboxylic acid anhydride, trimellitic acid anhydride, succinic acid anhydride, and dodecenyl succinic acid anhydride to produce a half ester of the butadiene polymer glycol and neutralizing the resultant half ester with a base to render it water dispersible said butadiene polymer having hydroxyl groups at terminal positions only.

2. The coating composition of claim 1, in which said composition contains the modified butadiene polymer glycol in a concentration of 30 to 60 weight percent.

3. The coating composition of claim 1, in which said composition has a pH value of 7.0 to 8.5.

4. The coating composition of claim 1, in which said butadiene polymer glycol has a molecular weight of 800 to 5,000.

5. The coating composition of claim 1, in which said butadiene polymer glycol is polybutadiene homopolymer glycol.

6. The coating composition of claim 1 in which said butadiene polymer is selected from the group consisting of homopolymers of butadiene and copolymers of at least 70 weight percent butadiene with up to 30 weight percent of an

TABLE 3

|  | Example | | | | | | | |
|---|---|---|---|---|---|---|---|---|
|  | 1 | | 2 | | 3 | | 4 | |
|  | A[1] | B[2] | A | B | A | B | A | B |
| Specific conductivity ($\mu\Omega\text{cm}.^{-1}$) | $2.23 \times 10^2$ | $2.37 \times 10^2$ | $2.83 \times 10^2$ | $2.95 \times 10^2$ | $3.05 \times 10^2$ | $3.11 \times 10^2$ | $2.55 \times 10^2$ | $2.63 \times 10^2$ |
| Voltage | 80 |  | 100 |  | 60 |  | 80 |  |
| Initial current (A) | 1.59 | 1.68 | 1.82 | 1.97 | 2.01 | 2.21 | 1.68 | 1.79 |
| Film thickness ($\mu$) | 29 | 33 | 28 | 30 | 24 | 27 | 31 | 34 |
| Coulombic yield (mg./coulomb) | 16.9 | 15.2 | 13.8 | 13.3 | 11.0 | 10.4 | 16.2 | 14.6 |
| Appearance of cured film | Good | Good | Good | Good | Good | Good | Good | Good | ethylenically unsaturated copolymerizable monomer.

7. The coating composition of claim 5 wherein said butadiene polymer is a homopolymer selected from the group consisting of 1,2-butadiene homopolymer, 1,4-butadiene homopolymer and 1,2- and 1,4-random butadiene homopolymer.

8. The coating composition according to claim 6 wherein said copolymerizable monomer is selected from the group consisting of isoprene, chloroprene, styrene, methyl methacrylate and acrylonitrile.

9. The coating composition according to claim 1 wherein said acid anhydride is selected from the group consisting of aliphatic and aromatic carboxylic acids having from 4 to 18 carbon atoms.

10. In a bath composition adapted for electrophoretic deposition containing aqueous medium and a resinous binder and a pigment dispersed in the aqueous medium, the improvement wherein the resinous binder comprises a modified butadiene polymer glycol prepared by reacting a butadiene polymer glycol having a hydroxyl group at both ends of the polymer main chain and a number average molecular weight of 200 to 10,000 with acid anhydride selected from the group consisting of maleic anhydride, phthalic anhydride, 3-chlorophthalic anhydride, 4-chlorophthalic anhydride, tetrahydrophthalic anhydride, hexahydrophthalic anhydride, endo-cis-bixyclo (2,2,1)-5-heptene-2,3-dicarboxylic acid anhydride, trimellitic acid anhydride, succinic acid anhydride, and dodecenyl succinic acid anhydride, to produce a half ester of the butadiene polymer glycol and neutralizing the resultant ester with a base to render it water dispersible, said butadiene polymer having hydroxyl groups at terminal positions only.

11. The bath composition of claim 10, in which the solid content of the composition is in the range of 5 to 30 weight percent.

12. The bath composition of claim 10, in which the pigment to binder ratio by weight is in the range of 1:1 to 1:5.